INVENTOR.
JOSEPH D. KIEFFER III
BY
D. Emmett Thompson
ATTORNEY.

United States Patent Office 3,348,432
Patented Oct. 24, 1967

3,348,432
PORTABLE ELECTRIC DRILL WITH CHUCK
KEY RETAINING STRUCTURE
Joseph D. Kieffer III, Camillus, N.Y., assignor to Rockwell Manufacturing Company, Pittsburgh, Pa., a corporation of Pennsylvania
Filed Oct. 20, 1965, Ser. No. 498,216
7 Claims. (Cl. 77—7)

This invention relates to portable electric drills of the type equipped with the conventional key-operated chuck.

More particularly, the invention has as an object a portable electric drill embodying a novel arrangement for retention of the chuck key to the drill when the key is not in use.

The invention consists in the novel features and in the combinations and constructions hereinafter set forth and claimed.

In describing this invention, reference is had to the accompanying drawing, in which like characters designate corresponding parts in all the views.

In the drawings—

Figure 1:
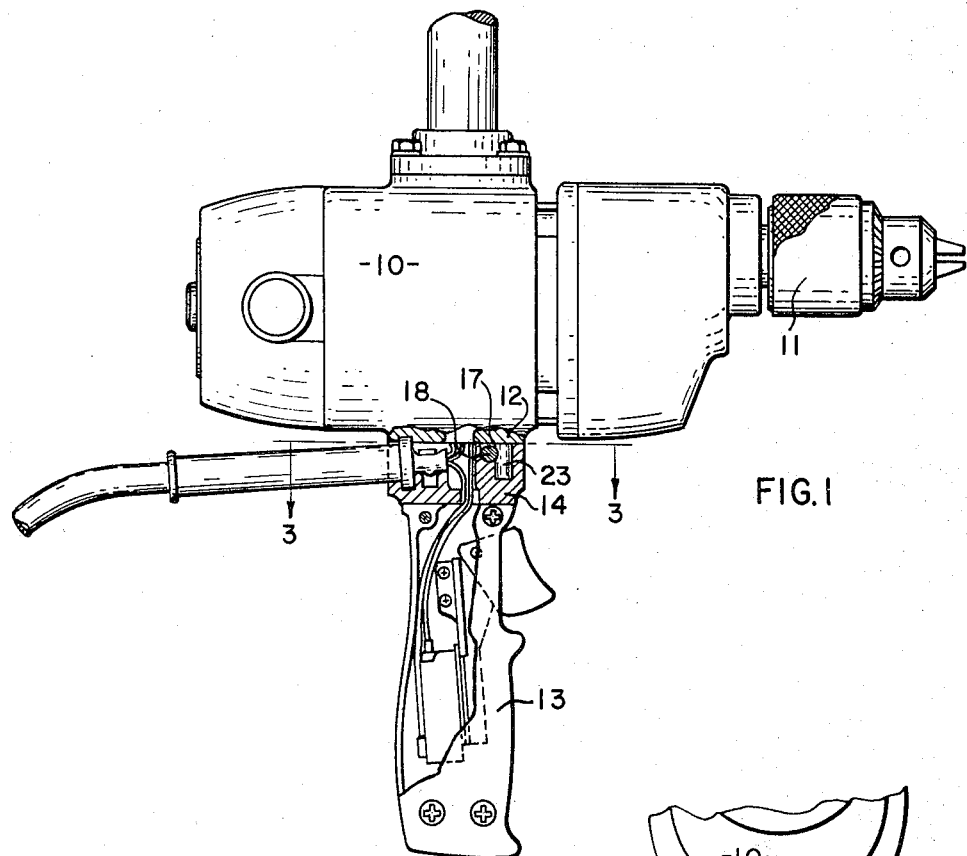
FIGURE 1 is a side elevational view with parts broken away and parts in section, of a portable electric drill embodying my invention.
Figure 2:
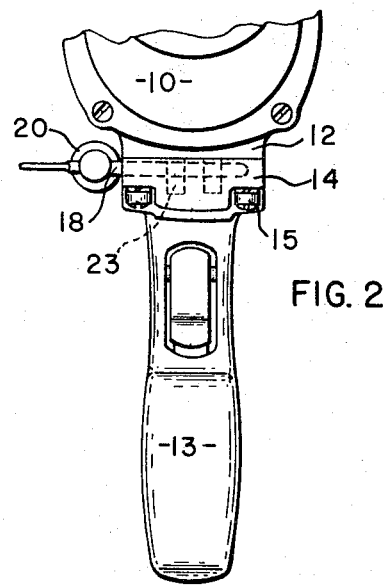
FIGURE 2 is a front elevational view of the handle and lower contiguous portion of the drill casing.

10 designates the casing of the drill which is equipped with a conventional key-operated chuck 11. The casing is formed on one side with a handle receiving surface which may be formed as by a boss 12, to which a handle 13 is affixed. The handle 13 is formed with an end portion 14 shown as of rectangular formation, and having a surface abutting the surface of the boss 12, and being fixed thereto as by screws 15 extending through apertures formed in the corners of the end portion 14 and threading into the boss 12.

The structure is formed with a slot 17 extending transversely of the abutting surfaces of the boss and handle end portion 14. The slot is open at least at one end, and is dimensioned to slidably receive the handle stem 18 of the chuck key 20. In the arrangement shown, the slot 17 is formed in the abutting surface of the handle end portion 14. One or more plugs 23 formed of resilient material, such as rubber, are positioned to extend partially into the slot 17 for frictional engagement with the chuck key handle stem 18 to frictionally retain the same in the slot. Inasmuch as the slot 17 is shown as being formed in the handle end portion 14, the plugs 23 are positioned in recesses formed in the abutting surface of the portion 14. These recesses extend downwardly into the portion 14 for a substantial depth and serve, in conjunction with the abutting surface of the casing, to trap the plugs 23 in fixed position, and the latter are of such diameter as to extend partially into the slot 17, as shown in FIGURE 3 of the drawings.

Figure 3:
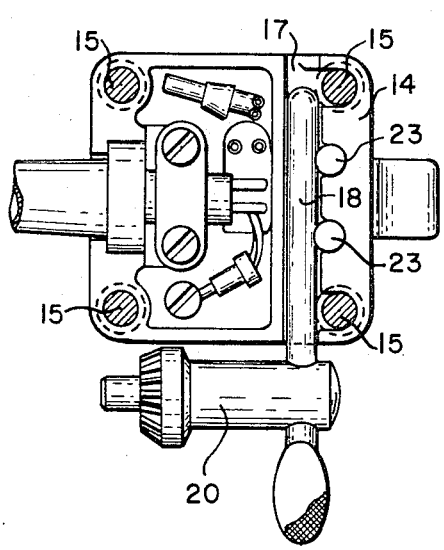
FIGURE 3 is an enlarged view taken on line 3—3, FIGURE 1.

It will be apparent that upon insertion of the chuck key handle stem 18 into the slot 17, the stem is frictionally engaged by the plugs 23 to retain the key in the position shown in FIGURE 3, in which position it does not in any way interfere with the manipulation and operation of the drill.

What I claim is:

1. A portable electric drill having a key-operated chuck on the output spindle thereof, said drill including a casing formed with a handle receiving surface, a handle extending radially from said casing, said handle being formed with an end portion having a surface abutting said handle receiving surface on said casing and being detachably secured thereto, a slot extending transversely of said abutting surfaces, said slot being open at one end and being dimensioned to slidably receive the handle stem of a chuck key, a plug of resilient material extending through the side wall of said slot and yieldingly engaging a chuck key handle stem inserted in said slot.

2. A portable electric drill as defined in claim 1 and including a plurality of said plugs.

3. A portable electric drill as defined in claim 1, wherein said slot is formed in one of said surfaces.

4. A portable electric drill having a key-operated chuck on the output spindle thereof, said drill including a casing formed with a handle receiving surface, a handle extending radially from said casing, said handle being formed with an end portion having a surface abutting said handle receiving surface of said casing and being detachably secured thereto, the abutting surface of said end portion of the handle being formed with a slot extending transversely thereof, said slot being open at one end and being dimensioned to slidably receive the handle stem of the chuck key, a plug of resilient material positioned in said handle end portion and extending through the side wall of said slot for yieldingly engaging said chuck key handle stem to frictionally retain the same in said slot.

5. A portable electric drill having a key-operated chuck on the output spindle thereof, said drill including a casing formed with a boss on one side thereof, a handle extending radially from said casing, said handle being formed with an end portion having a surface abutting said boss and being detachably secured thereto, the abutting surface of said handle being formed with a slot extending transversely thereof and with a recess at one side of said slot and communicating therewith, a plug of resilient material positioned in said recess and extending into said slot for yieldingly engaging the chuck key handle stem positioned in said slot for retaining said stem in said slot.

6. A portable electric drill as defined in claim 5 and including a plurality of said plugs and the boss on said drill casing forming the top closure for said slot and recess.

7. A portable electric drill as defined in claim 5, wherein the confronting surfaces of said boss and handle are formed with additional mating concavities for the reception of power cord grip.

References Cited

UNITED STATES PATENTS 1,647,396   11/1927   Decker _____ 77—6

FRANCIS S. HUSAR, *Primary Examiner.*